United States Patent
Elleboe et al.

(10) Patent No.: US 10,122,724 B2
(45) Date of Patent: Nov. 6, 2018

(54) DETECTION AND MANAGEMENT OF UNAUTHORIZED USE OF CLOUD COMPUTING SERVICES

(71) Applicant: AT&T Intellectual Property I, L.P., Atlanta, GA (US)

(72) Inventors: Flemming Elleboe, Mariette, GA (US); Luis Francisco Albisu, Fairfax Station, VA (US); Joseph Bentfield, Waukesha, WI (US); Janet Kerns, Bellevue, WA (US); Jonathan Sheriffs, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/953,810

(22) Filed: Nov. 30, 2015

(65) Prior Publication Data
US 2016/0087988 A1 Mar. 24, 2016

Related U.S. Application Data

(63) Continuation of application No. 13/533,312, filed on Jun. 26, 2012, now Pat. No. 9,203,847.

(51) Int. Cl.
*H04L 29/06* (2006.01)
*G06F 21/00* (2013.01)
(Continued)

(52) U.S. Cl.
CPC ........ *H04L 63/101* (2013.01); *H04L 63/0236* (2013.01); *H04L 63/107* (2013.01);
(Continued)

(58) Field of Classification Search
CPC ... H04L 63/101; H04L 67/10; H04L 63/0236; H04L 63/20; H04L 63/107; H04L 2463/146
See application file for complete search history.

(56) References Cited

U.S. PATENT DOCUMENTS 7,596,620 B1 9/2009 Colton et al.
8,966,625 B1 2/2015 Zuk et al.
(Continued)

FOREIGN PATENT DOCUMENTS

EP 2778917 9/2014
WO WO 2013080204 A1 * 6/2013 ............. H04L 63/06

OTHER PUBLICATIONS

Kamalakanta Sethi, Anish Chopra, Padmalochan Bera, Bata Krishna Tripathy; "Integration of role based access control with homomorphic cryptosystem for secure and controlled access of data in cloud"; Oct. 2017; SIN '17: Proceedings of the 10th International Conference on Security of Information and Networks; Publisher: ACM; pp. 1-6.*

(Continued)

*Primary Examiner* — Shewaye Gelagay
*Assistant Examiner* — Courtney Fields
(74) *Attorney, Agent, or Firm* — Hartman & Citrin LLC

(57) ABSTRACT

Concepts and technologies disclosed herein are for detecting and managing unauthorized use of cloud computing services from within an internal network of a business or other organization. A computer system may be configured to identify a plurality of Web resources that have been accessed by computing devices from within the internal network. The computer system may also be configured to obtain Internet protocol ("IP") information from a network component of the internal network. The IP information may be used to determine whether each of the plurality of Web resources is a cloud computing service resource. The computer system may also be configured to block access to a cloud computing service resource of the plurality of Web resources upon determining that the IP information identifies the cloud computing service resource as being unauthorized.

20 Claims, 8 Drawing Sheets

(51) Int. Cl.
  *H04L 29/08* (2006.01)
  *H04L 9/08* (2006.01)
  *G06F 12/00* (2006.01)
(52) U.S. Cl.
  CPC .............. *H04L 63/20* (2013.01); *H04L 67/10* (2013.01); *H04L 2463/146* (2013.01)

(56) References Cited

U.S. PATENT DOCUMENTS

| | | |
|---|---|---|
| 2002/0178169 A1 | 11/2002 | Nair et al. |
| 2010/0257605 A1* | 10/2010 | McLaughlin ....... H04L 63/0209 726/23 |
| 2011/0131275 A1 | 6/2011 | Maida-Smith et al. |
| 2012/0167180 A1 | 6/2012 | Lee et al. |
| 2012/0266231 A1* | 10/2012 | Spiers ................. H04L 63/0218 726/12 |
| 2013/0247183 A1 | 9/2013 | Kumar et al. |

OTHER PUBLICATIONS

Fang Hao, T. V. Lakshman, Sarit Mukherjee, Haoyu Song; "Enhancing dynamic cloud-based services using network virtualization"; SIGCOMM Computer Communication Review, vol. 40 Issue 1; Publisher: ACM; Jan. 2010; pp. 67-74.

Antedomenic, N., "Optimizing Security of Cloud Computing with the DOD," Thesis, Naval PostGraduate School, Dec. 2010.

Mogull, R., "Detecting and Managing Unauthorized Use of Cloud Computing" [http://searchcloudsecurity.techtarget.com/tip/Detecting-and-managing-unauthorized-use-of-cloud-computing], accessed Apr. 24, 2012.

Gittlen, S., "The Tech Tug-of-War," [http://blogs.computerworld.com/18243/the_tech_tug_of_war], May 5, 2011.

U.S. Office Action dated Apr. 16, 2015 in U.S. Appl. No. 13/533,312.

U.S. Notice of Allowance dated Jul. 24, 2015 in U.S. Appl. No. 13/533,312.

* cited by examiner

DETECTION AND MANAGEMENT OF UNAUTHORIZED USE OF CLOUD COMPUTING SERVICES

CROSS-REFERENCE TO RELATED APPLICATIONS

This application is a continuation of and claims priority to U.S. patent application Ser. No. 13/533,312, entitled "Detection and Management of Unauthorized Use of Cloud Computing Services," filed Jun. 26, 2012, now allowed and issued as U.S. Pat. No. 9,203,847, which is incorporated herein by reference in its entirety.

TECHNICAL FIELD

The concepts and technologies disclosed herein generally relate to network security. More specifically, the concepts and technologies disclosed herein relate to the detection and management of unauthorized use of cloud computing services.

BACKGROUND

In recent years, the computing industry began a transition from a traditional computing model, by which software and other computing resources are stored, managed, and processed on local computers, to a cloud computing model, by which software and other computing resources are stored, managed, and/or processed on remote computers that are often collectively referred to as "the cloud." Many organizations have made the transition to the cloud, while others are at least contemplating a strategy to do so.

The benefits of a cloud computing model are numerous. By making the transition to a cloud computing model, organizations may benefit from access to data at all times, the reduction or elimination of physical storage centers, and cost savings realized by the reduction of operating, maintenance, and other information technology costs. For many organizations, the transition to a cloud computing model is accompanied by new risks, such as the potential for proprietary and other sensitive information to be knowingly or unknowingly shared with external computing resources associated with the cloud computing services.

SUMMARY

Concepts and technologies disclosed herein are for detecting and managing unauthorized use of cloud computing services from within an internal network of a business or other organization. A computer system may be configured to identify a plurality of Web resources that have been accessed by computing devices from within the internal network. The computer system may also be configured to obtain Internet protocol ("IP") information from a network component of the internal network. The IP information may be used to determine whether each of the plurality of Web resources is a cloud computing service resource. The computer system may also be configured to block access to a cloud computing service resource of the plurality of Web resources upon determining that the IP information identifies the cloud computing service resource as being unauthorized.

In some embodiments, the computer system is further configured to search for an individual that has accessed the cloud computing service resource via one of the computing devices from within the internal network to ensure ongoing compliance with a cloud computing service access policy that governs the internal network. In some embodiments, in being configured to search for the individual, the computer system is configured to search for a source IP address that is included in an unauthorized list, utilize the source IP address to extract information identifying the individual, and contact the individual to ensure ongoing compliance with the cloud computing service access policy that governs the internal network.

In some embodiments, in being configured to identify the cloud computing service resource, the computer system is configured to obtain an access log from the network component, generate a list of unique networks accessed from within the internal network based upon information contained within the access log, generate a list of unique domain name system addresses that have been queried from within the internal network, search an Internet registry using the list of unique networks and the list of unique domain name system addresses, sort and summarize networks identified through the search of the Internet registry to generate a company list, analyze the company list to identify potential cloud computing service companies, mark records within the company list as being associated with the cloud computing service companies, and establish a baseline utilizing the company list. The baseline includes the records. In some embodiments, the computer system is further configured to verify that the company list includes only approved cloud computing service companies.

In some embodiments, in being configured to obtain the IP information from the network component of the internal network, the computing system is configured to obtain an access log from the network component, obtain destination IP addresses and source IP addresses from the access log, summarize and sort the destination IP addresses to identify destination networks, compare the destination IP addresses to a baseline to identify the cloud computing service resource that was accessed, and determine whether the cloud computing service resource is approved based upon the comparison. In these embodiments, upon determining that the cloud computing service resource is approved, the computing system is configured to permit continued access by the computing devices to the cloud computing service resource. Also in these embodiments, upon determining that the cloud computing service resource is not approved, the computing system is configured to search the access log for a source IP address of the source IP addresses that accessed the cloud computing resource, and generate an unauthorized list comprising the source IP address.

In some embodiments, the computing system is further configured to instruct a device management application that is resident on a computing device of the computing devices that is associated with the source IP address to determine whether a cloud computing service software application is also resident on the computing device. In these embodiments, upon determining that the cloud computing service software application is resident on the computing device, the computing system is configured to add the source IP address associated with the computing device to the unauthorized list.

In some embodiments, in being configured to block access to the cloud computing service resource, the computing system is configured to instruct the network component to block access to the cloud computing service resource. In some other embodiments, in being configured to block access to the cloud computing service resource, the computing system is configured to instruct the device management application that is resident on a computing device of the computing devices that is associated with the source IP address to delete a cloud computing service software application that is associated with the cloud computing resource from the computing device.

It should be appreciated that the above-described subject matter may be implemented, for example, as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
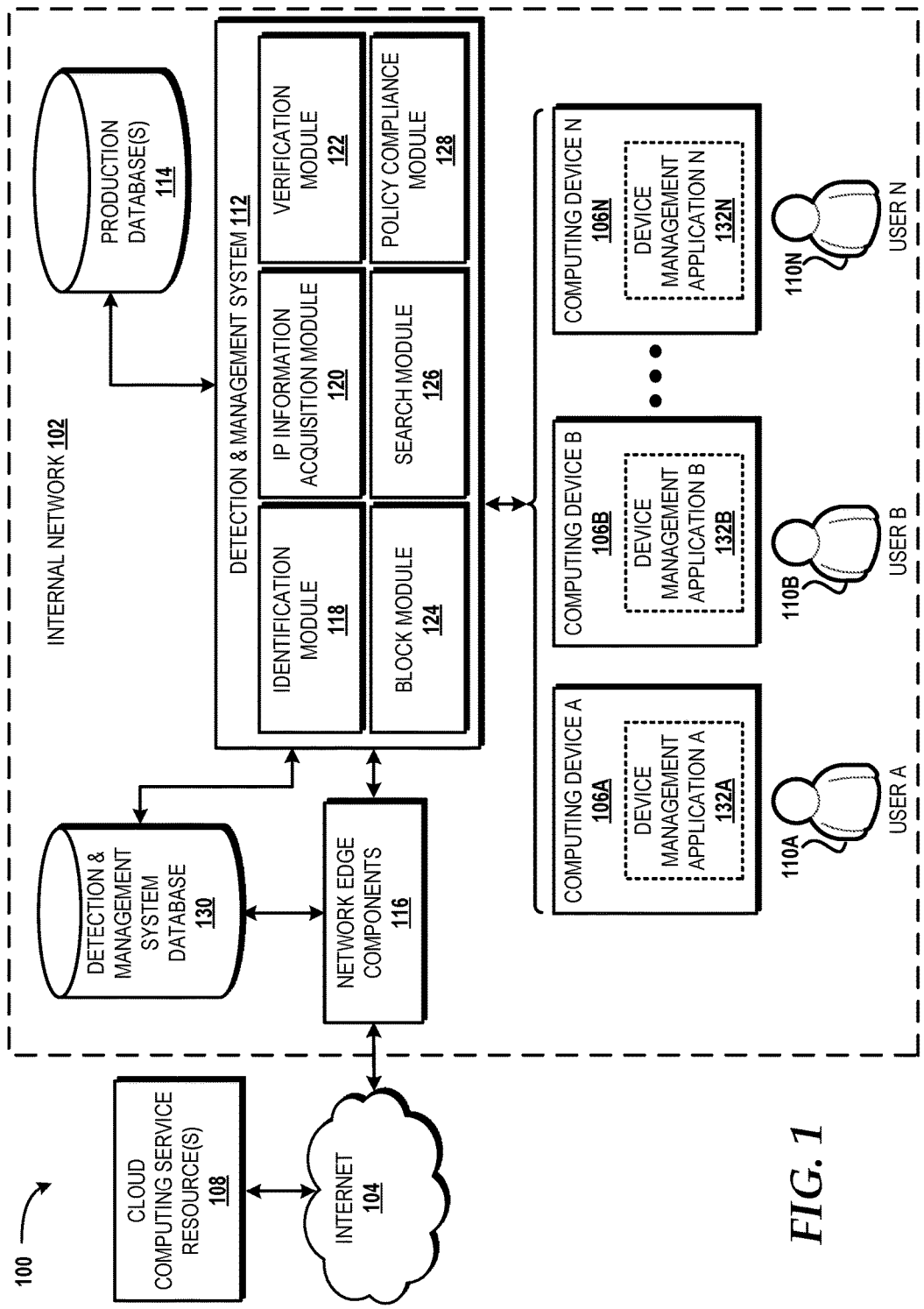
FIG. 1 is a diagram illustrating an illustrative operating environment for implementing various embodiments presented herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodologies, among others, for detecting and managing unauthorized use of cloud computing services will be presented.

Referring now to FIG. 1, aspects of an operating environment 100 for various embodiments presented herein will be described. The illustrated operating environment 100 includes an internal network 102. In some embodiments, the internal network 102 is operated by or for an enterprise or other organization (hereinafter referred to generically as "organization"). In some embodiments, the internal network 102 is configured to utilize one or more local area network ("LAN") networking technologies to facilitate communication among computing devices, databases, systems, and/or networking components within the internal network 102. The LAN networking technologies may facilitate such communication by providing wired and/or wireless connectivity, which may be provided in accordance with one or more Institute of Electrical and Electronic Engineers ("IEEE") 802.11 standards, such as IEEE 802.3 ("Ethernet") and/or IEEE 802.11 ("WI-FI") standards.

The internal network 102 is illustrated as being in communication with the Internet 104, through which one or more computing devices 106 operating within the internal network 102 may access one or more cloud computing service resources ("CCSRs") 108 provided by one or more cloud computing service providers (not shown). More particularly, the illustrated internal network 102 includes a computing device A 106A, a computing device B 106B, and a computing device N 106N (hereinafter referred to collectively and/or generically as "computing devices 106"). Each of the computing devices 106 may be a desktop computer, a laptop computer, a tablet computer, an ultraportable computer, a personal digital assistant ("PDA"), a smartphone, a video game console, a consumer electronics device, or any other type of computing device configured to perform various operations, actions, and/or functions described herein as being performed by the computing devices 106.

Moreover, each of the illustrated computing devices 106 is associated with one of a plurality of users 110 (hereinafter referred to collectively and/or generically as "users 110"). In the illustrated embodiment, the users 110 include a user A 110A that is illustrated as being associated with the computing device A 106A, a user B 110B that is illustrated as being associated with the computing device B 106B, and a user N 110N that is illustrated as being associated with the computing device N 106N. It is contemplated, however, that any number of users may be associated with a particular computing device at a given time. For instance, a plurality of users may share a computing device during their respective work shifts.

The users 110 may from time to time access one or more of the CCSRs 108 via a respective one of the computing devices 106 in the course of work performed for the organization, for personal reasons, or for both. The organization may establish or have established on behalf thereof one or more policies that define, to some degree, what type of information, if any, may be provided to and/or received from cloud computing services. The concepts and technologies disclosed herein may be utilized, at least in part, to detect and manage unauthorized use of one or more of the CCSRs 108 to ensure ongoing compliance with such policies.

The CCSRs 108 may include servers, databases, networks, applications, and/or other computing resources that are utilized by one or more cloud computing service providers to provide a cloud computing service. A cloud computing service is defined herein as a service provided in accordance with a cloud computing model that enables ubiquitous, convenient, on-demand network access to a shared pool of configurable computing resources that can be rapidly provisioned and released with minimal management effort or service provider interaction. A cloud infrastructure is defined herein as the collection of hardware and software that enables a cloud computing service.

In some embodiments, one or more of the CCSRs 108 is configured to provide Software as a Service ("SaaS"). SaaS is defined herein as the capability provided to the user to use the provider's application operating on a cloud infrastructure. The applications are accessed by the user via various client devices, such as the computing devices 106, through either a thin client interface, such as a Web browser, or a program interface. The user does not manage or control the underlying cloud infrastructure including networks, servers, operating systems, storage, or individual application capabilities, with the possible exception of user-specific application configuration settings.

In some embodiments, one or more of the CCSRs 108 is configured to provide Platform as a Service ("PaaS"). PaaS is defined herein as the capability provided to the user to deploy onto a cloud infrastructure user-created or acquired applications created using programming languages, libraries, services, and/or tools supported by the provider. The user does not manage or control the underlying cloud infrastructure including networks, servers, operating systems, and storage, but has control over the deployed applications and possibly configuration settings for the application-hosting environment.

In some embodiments, one or more of the CCSRs 108 is configured to provide Infrastructure as a Service ("IaaS"). IaaS is defined herein as the capability provided to the user to provision processing, storage, networks, and other computing resources where the user is able to deploy and run arbitrary software, which can include operating systems and applications. The user does not manage or control the underlying cloud infrastructure, but has control over operating systems, storage, and deployed applications; and possibly limited control of select networking components (e.g., host firewalls).

In some embodiments, one or more of the CCSRs 108 is provided as part of a private cloud infrastructure. A private cloud infrastructure is defined herein as a cloud infrastructure that is provisioned for exclusive use by a single organization including multiple users. A private cloud infrastructure may be owned, managed, and operated by the organization, a third party, or some combination thereof. A private cloud infrastructure may exist on or off premises. In context of the concepts and technologies disclosed herein, one or more of the users 110 may access a private cloud infrastructure provided, at least in part, by one or more of the CCSRs 108 via the computing devices 106 for personal and/or business use in association with an organization other than the organization that is associated with the internal network 102.

In some embodiments, one or more of the CCSRs 108 is provided as part of a community cloud infrastructure. A community cloud infrastructure is defined herein as a cloud infrastructure that is provisioned for exclusive use by a specific community of users from organizations that have shared concerns (e.g., mission, security requirements, policy, and compliance considerations). A community cloud infrastructure may be owned, managed, and operated by one or more organizations in the community, a third party, or some combination thereof. A community cloud infrastructure may exist on or off premises. In context of the concepts and technologies disclosed herein, one or more of the users 110 may access a community cloud infrastructure provided, at least in part, by one or more of the CCSRs 108 via the computing devices 106 for personal and/or business use in association with one or more organizations, which may or may not include the organization that is associated with the internal network 102.

In some embodiments, one or more of the CCSRs 108 is provided as part of a public cloud infrastructure. A public cloud infrastructure is defined herein as a cloud infrastructure that is provisioned for open use by the general public. A public cloud infrastructure may be owned, managed, and operated by a business, academic, or government organization, or some combination thereof. A public cloud infrastructure exists on the premises of the cloud service provider. In context of the concepts and technologies disclosed herein, one or more of the users 110 may access a public cloud infrastructure provided, at least in part, by one or more of the CCSRs 108 via the computing devices 106 for personal and/or business use.

In some embodiments, one or more of the CCSRs 108 is provided as part of a hybrid cloud infrastructure. A hybrid cloud infrastructure is defined herein as a cloud infrastructure that is a composition of two or more distinct cloud infrastructures—private, community, or public—that remain unique entities, but are bound together by standardized or proprietary technology that enables data and application portability. In context of the concepts and technologies disclosed herein, one or more of the users 110 may access a hybrid cloud infrastructure provided, at least in part, by one or more of the CCSRs 108 via the computing devices 106 for personal and/or business use.

The organization associated with the internal network 102 may want to prevent proprietary or other sensitive information from being provided to one or more of the CCSRs 108 for any of a myriad of reasons that may affect, in one way or another, the organization by the release of said proprietary or sensitive information. For instance, the release of proprietary information may adversely affect an upcoming product or service launch by leaking important information before a predetermined date and time. The release of other sensitive information, such as customer information, may adversely affect the perception of the organization by the public or others within an industry because of the organization's inadvertent exposure of customer information to a third party that operates a cloud computing service. It should be understood that these possible reasons for an illustrative organization wanting to prevent the release of proprietary or sensitive information are intended to provide some additional context to elaborate on a context in which the concepts and technologies disclosed herein may be implemented. Accordingly, these reasons should not be construed as being limiting in any way.

The illustrated internal network 102 also includes a detection and management system 112. In some embodiments, the detection and management system 112 is generally configured to utilize database activity monitoring, Uniform Resource Locator ("URL") filtering, Data Loss Prevention ("DLP"), and gateway/Internet firewalls to detect and manage unauthorized access to one or more of the CCSRs 108.

Database activity monitoring may be utilized by the detection and management system 112 to capture data being copied or moved from one or more production databases 114 to one or more of the CCSRs 108. This could indicate, for example, a potential move initiated by one or more of the users 110 to an external production and/or test environment. Such a move may or may not be in compliance with the policies of the organization regarding the use of cloud computing services for such purposes. If a data chunk of a threshold size is copied or moved from the production databases 114, the detection and management system 112 may flag this activity for further analysis. The threshold size may be set by the organization so as to identify data of a size that is larger than an allowed size utilized during normal procedures, such as data exchanges between components within the internal network 102. Upon further analysis, if the detection and management system 112 determines that data extracted from the production databases 114 is being provided to a URL associated with a cloud computing service provider, the detection and management system 112 may be configured to generate an alarm or other notification, which may be utilized as a trigger to block access to the URL.

The detection and management system 112 may utilize one or more URL filtering tools to detect access to one or more of the CCSRs 108. Some cloud computing services utilize a Web management interface. Since Web management interfaces are different from interfaces that connect to a Web site that hosts the service, the detection and management system 112 can reliably detect (i.e., without many, if any, false positives) access to one or more of the CCSRs 108. Moreover, Application Programming Interface ("API") calls are often provided over Hypertext Transfer Protocol ("HTTP") to known URLs. As such, calls to such APIs can be traced back to access to one or more of the CCSRs 108.

DLP may be utilized by the detection and management system 112 to detect proprietary or other sensitive information leaving the internal network 102 to one or more of the CCSRs 108. Over time, the DLP tools utilized by the detection and management system 112 may be tuned for cloud-specific situations by accounting for the context in which information leaves the internal network 102, such as the destination of the information.

In the illustrated embodiment, the detection and management system 112 is in communication with one or more network edge components 116. The network edge components 116 include one or more firewalls, and may additionally include one or more routers, switches, servers, or other networking components that facilitate, at least in part, a connection between the internal network 102 and the Internet 104. In some embodiments, a firewall is implemented in software or firmware, such as within a router, switch, or other networking component. In some other embodiments, a firewall is implemented as a hardware firewall. The firewalls may be instructed by the detection and management system 112 to detect and/or block access to one or more of the CCSRs 108.

In some embodiments, the detection and management system 112 is configured to execute a number of program modules in order to perform various operations, actions, and functions described herein by implementing one or more of the above-described tools and methodologies. In the illustrated embodiment, the detection and management system 112 is configured to execute an identification module 118, an IP information acquisition module 120, a verification module 122, a block module 124, a search module 126, and a policy compliance module 128 to perform various operations, actions, and/or functions described herein. These modules may execute on a single detection and management system 112, as in the illustrated embodiment, or in parallel across multiple detection and management systems (not shown). In addition, each module may consist of a number of subcomponents executing on detection and management systems or other computing systems or devices within, or in communication with, the detection and management system 112. Two or more of the modules may be combined. The modules may be implemented as software, hardware, or any combination thereof.

The identification module 118 is configured to identify one or more potential cloud computing service resources that have been accessed from within the internal network 102. Operations, actions, and/or functions performed by the identification module 118 are described in greater detail herein below with reference to FIGS. 2 and 3.

The acquisition module 120 is configured to obtain IP information from one or more of the network edge components 116 on a periodic basis. Operations, actions, and/or functions performed by the acquisition module 120 are described in greater detail herein below with reference to FIGS. 2 and 4.

The verification module 122 is configured to verify unauthorized access to one or more of the CCSRs 108. Operations, actions, and/or functions performed by the verification module 122 are described in greater detail herein below with reference to FIGS. 2 and 6.

The block module 124 is configured to instruct one or more of the network edge components 116 to block unauthorized access to one or more of the CCSRs 108. Operations, actions, and/or functions performed by the block module 124 are described in greater detail herein below with reference to FIGS. 2 and 6.

The search module 126 is configured to search for one or more offenders, such as one or more of the users 110, that have accessed one or more of the CCSRs 108 in a manner that is out of compliance with one or more policies of the organization. Operations, actions, and/or functions performed by the search module 126 are described in greater detail herein below with reference to FIGS. 2 and 7.

The policy compliance module 128 is configured to determine whether access attempts are within or out of compliance with one or more policies of the organization. Operations, actions, and/or functions performed by the policy compliance module 128 are described in greater detail herein below with reference to FIGS. 2 and 7.

The detection and management system 112 is configured to store data obtained and/or generated through various operations, actions, and/or functions performed by the modules described herein above in a detection and management system database 130. The detection and management system 112 and/or the network edge components 116 may access the detection and management system database 130 to obtain data for use in performing particular operations, actions, and/or functions. The detection and management system 112 may additionally or alternatively include local storage, which may or may not include the detection and management system database 130.

Each of the computing devices 106 is illustrated as having a device management application 132 stored thereon. In particular, the computing device A 106A has a device management application A 132A, the computing device B 106B has a device management application B 132B, and the computing device N 106N has a device management application N 132N. The device management applications 132 are configured to receive instructions from the detection and management system 112 requesting the device management applications 132 to identify whether one or more cloud computing service software applications are stored on the computing devices 106. In some embodiments, the device management applications 132 are configured to identify access to one or more of the CCSRs 108 from a Web browser history, cookie, favorite, bookmark, or other information obtained from a Web browser that is installed on the computing devices 106. In some other embodiments, the device management applications 132 are configured to identify a software application utilized, at least in part, to access and interact with one or more of the CCSRs 108.

Figure 2:
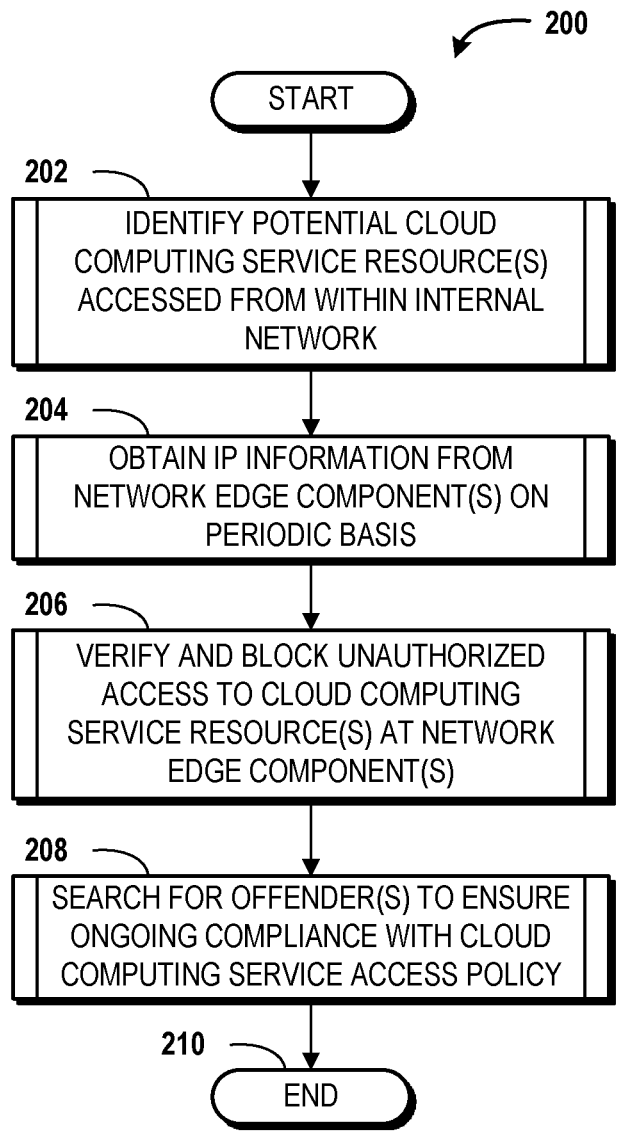
FIG. 2 is a flow diagram showing aspects of a method for detecting and managing unauthorized use of cloud computing service resources, according to an illustrative embodiment.

Turning now to FIG. 2, a flow diagram showing aspects of a method 200 for detecting and managing unauthorized use of cloud computing service resources will be described, according to an illustrative embodiment. It should be understood that the operations, functions, or actions illustrated by one or more blocks in the methods disclosed herein are not necessarily presented in any particular order and that performance of some or all of the operations, functions, or actions in an alternative order(s) is possible and is contemplated. The operations, functions, or actions have been presented in the demonstrated order for ease of description and illustration. Operations, functions, or actions may be added, omitted, and/or performed simultaneously, without departing from the scope of the appended claims.

It also should be understood that the illustrated methods can be ended at any time and need not be performed in their respective entireties. Some or all operations, functions, or actions of the methods, and/or substantially equivalent operations, functions, or actions, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single processor or multi-processor systems, wireless devices, mobile devices, minicomputers, mainframe computers, personal computers, hand-held computing devices, processor-based, programmable consumer electronics, combinations thereof, and the like.

Thus, it should be appreciated that the logical operations, functions, or actions described herein may be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations, functions, or actions described herein are referred to variously as states, operations, structural devices, acts, or modules. These operations, structural devices, acts, and modules may be implemented in software, in firmware, in special purpose digital logic, and any combination thereof.

The method 200 begins and proceeds to block 202, wherein the detection and management system 112, and more particularly the identification module 118, identifies one or more potential CCSRs that have been accessed by one or more of the computing devices 106 from within the internal network 102. At this point, the detection and management system 112 has not yet verifiably determined that the Web resources accessed by the computing devices 106 are associated with cloud computing services. As such, block 202 includes identifying Web resources that are potentially associated with cloud computing services. The potential CCSRs may include actual CCSRs, such as the CCSRs 108, and/or other Web resources that are not associated with a cloud computing service. An illustrative method for identifying potential CCSRs that have been accessed by one or more of the computing devices 106 from within the internal network 102 is described in greater detail below with reference to FIG. 3.

From block 202, the method 200 proceeds to block 204, wherein the detection and management system 112, and more particularly the IP information acquisition module 120, obtains IP information, such as IP destination addresses and IP source addresses, from one or more of the network edge components 116 on a periodic basis. The periodic basis may include any time period. In some embodiments, the periodic basis is hourly, daily, weekly, bi-weekly, or monthly. The periodic basis may be established based upon the needs of the owner and/or operator of the internal network 102, which may include the need to ensure compliance with one or more policies established, at least in part, to maintain the security of proprietary or other sensitive information exchanged within and outside of the internal network 102. An illustrative method for obtaining IP information from the network edge components 116 on a periodic basis is described in greater detail herein below with reference to FIG. 4.

From block 204, the method 200 proceeds to block 206, wherein the detection and management system 112, and more particularly the verification module 122, verifies unauthorized access to the CCSRs 108. Also at block 206, the detection and management system 112, and more particularly the block module 124, blocks unauthorized access to the CCSRs 108. An illustrative method for verifying and blocking unauthorized access to CCSRs is described in greater detail below with reference to FIG. 6.

From block 206, the method 200 proceeds to block 208, wherein the detection and management system 112, and more particularly the search module 126, searches for one or more offenders that have accessed an unauthorized CCSR to ensure ongoing compliance with one or more cloud computing service access policies established by or for the owner and/or operator of the internal network 102. An illustrative method for searching for such offenders is described in greater detail below with reference to FIG. 7.

After block 208, the method 200 may proceed to block 210 and end, or the method 200 may revert back to block 202. The method 200 may repeat (e.g., periodically, continuously, or on-demand).

Figure 3:
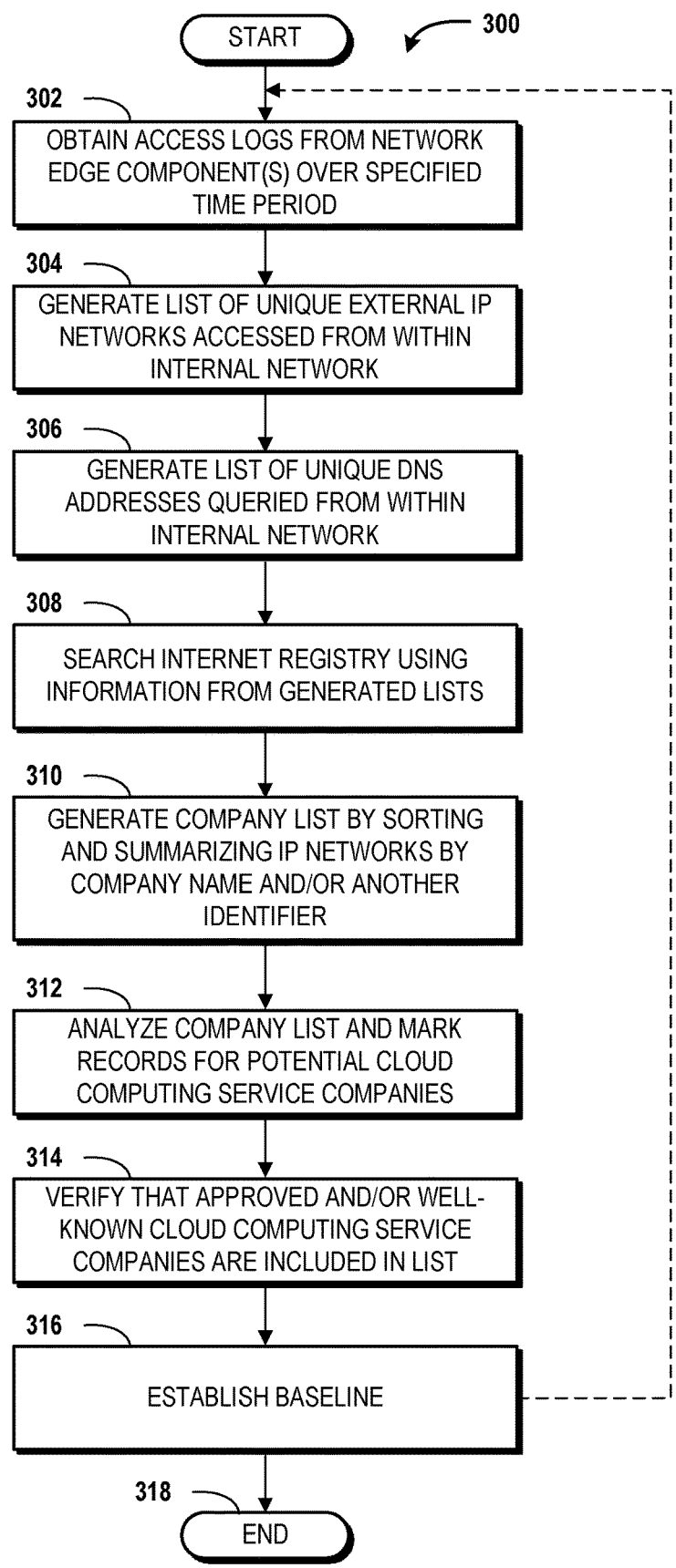
FIG. 3 is a flow diagram showing aspects of a method for identifying potential cloud computing service resources that have been accessed by one or more computing devices from within an internal network, according to an illustrative embodiment.

Turning now to FIG. 3, a method 300 for identifying potential CCSRs that have been accessed by one or more of the computing devices 106 from within the internal network 102 will be described, according to an illustrative embodiment. The operations, actions, and/or functions described as being performed at the illustrated blocks are described generically as being performed by the detection and management system 112. More particularly, though, the detection and management system 112 may execute the identification module 118 to perform these operations, actions, and/or functions.

The method 300 begins and proceeds to block 302, wherein the detection and management system 112 obtains access logs from one or more of the network edge components 116 over a specified time period. In some embodiments, the access logs include a list of requests for files that one or more of the users 110 have requested via one or more of the computing devices 106 from a Web site or other Web resource, such as one or more of the CCSRs 108, available via the Internet 104. The files may include Hypertext Markup Language ("HTML") files, including any embedded graphic images, or any other associated files that are transmitted in response to requests.

In some embodiments, the access logs include a number of visitors, which may be enumerated as unique first-time requests to one or more Web sites or other Web resources. In some embodiments, the access logs include an indication of one or more external IP networks accessed by one or more of the computing devices 106 from within the internal network 102. In some embodiments, the access logs include an indication of one or more Domain Name System ("DNS") addresses queried by one or more of the computing devices 106 from within the internal network 102. In some embodiments, the access logs include an origin of the visitors in terms of the visitor's associated server's domain name. In some embodiments, the access logs include a number of requests for each accessed Web site or a number of requests for each Web page accessed within a Web site. In some embodiments, the access logs provide one or more usage patterns based upon time of day, day of week, week of month, month of year, quarterly, seasonally, or the like.

In some embodiments, the detection and management system 112 is configured to aggregate access logs from a plurality of the network edge components 116. In some embodiments, the detection and management system 112 is configured to extract one or more specific data items from the access logs that are useable by the detection and management system 112 to perform other operations, functions, or actions described below.

In some embodiments, the detection and management system 112 provides the access logs obtained at block 302 to the detection and management system database 130 for storage. In these embodiments, the detection and management system 112 requests the access logs as needed from the detection and management system database 130. In some other embodiments, the detection and management system 112 is configured to temporarily store the access logs, such as in a cache memory or other local storage of the detection and management system 112.

From block 302, the method 300 proceeds to block 304, wherein the detection and management system 112 generates a list of unique external IP networks that have been accessed by the computing devices 106 from within the internal network 102, as indicated in the access logs obtained at block 302. From block 304, the method 300 proceeds to block 306, wherein the detection and management system 112 generates a list of unique DNS addresses that have been queried by the computing devices 106 from within the internal network 102.

From block 306, the method 300 proceeds to block 308, wherein the detection and management system 112 searches one or more Internet registries using information obtained from one or both of the lists generated at block 304 and block 306. In some embodiments, the Internet registry is a regional Internet registry such as the American Registry for Internet Numbers ("ARIN"), which manages the allocation and registration of Internet number resources such as IP addresses.

From block 308, the method 300 proceeds to block 310, wherein the detection and management system 112 generates a company list by sorting and summarizing IP networks identified by the search performed at block 308. In some embodiments, the detection and management system 112 sorts the IP networks by company name obtained from the search results. In some other embodiments, the detection and management system 112 sorts the IP networks by another unique identifier that distinguishes each IP network.

From block 310, the method 300 proceeds to block 312, wherein the detection and management system 112 analyzes the company list and marks one or more records contained therein as being associated with a potential cloud computing service company. From block 312, the method 300 proceeds to block 314, wherein the detection and management system 112 verifies that approved and/or well-known cloud computing service companies are included in the company list.

From block 314, the method 300 proceeds to block 316, wherein the detection and management system 112 utilizes the verified list to establish a baseline of cloud computing services and identifying information thereof. The baseline is used as a reference for additional operations, actions, and/or functions described herein.

After block 316, the method 300 may proceed to block 318 and end. The method 300 may repeat (e.g., periodically, continuously, or on-demand) or terminate. In some embodiments, the method 300 is repeated on a periodic basis so that the baseline is improved over time.

Figure 4:
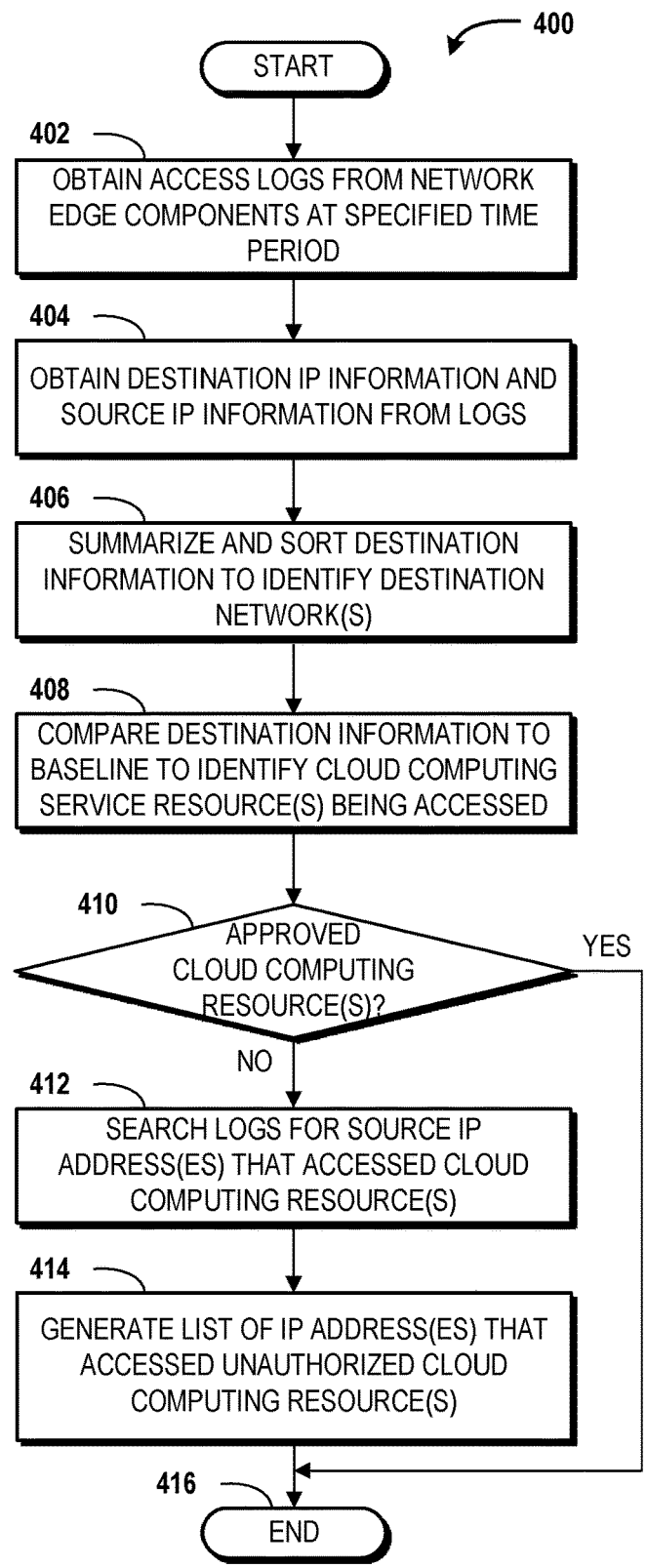
FIG. 4 is a flow diagram showing aspects of a method for obtaining IP information from one or more network edge components within an internal network on a periodic basis, according to an illustrative embodiment.

Turning now to FIG. 4, a method 400 for obtaining IP information from one or more of the network edge components 116 on a periodic basis will be described, according to an illustrative embodiment. The operations, actions, and/or functions described as being performed at the illustrated blocks are described generically as being performed by the detection and management system 112. More particularly, though, the detection and management system 112 may execute the IP information acquisition module 120 to perform these operations, actions, and/or functions.

The method 400 begins and proceeds to block 402, wherein the detection and management system 112 obtains access logs from one or more of the network edge components 116 for a specified time period. In some embodiments, the specified time period is an hour, day, week, month, year, or the like. In some embodiments, the access logs are obtained from the detection and management system database 130 instead of directly from the network edge components 116.

From block 402, the method 400 proceeds to block 404, wherein the detection and management system 112 obtains destination IP information and source IP information from the access logs that were obtained at block 402. From operation 404, the method 400 proceeds to operation 406, wherein the detection and management system 112 summarizes and sorts the destination information to identify one or more destination networks.

From operation 406, the method 400 proceeds to operation 408, wherein the detection and management system 112 compares the destination information to the baseline established at block 316 of the method 300 described above to identify cloud computing resource(s) that have been accessed from within the internal network 102. At block 410, the detection and management system 112 determines, based upon the comparison, whether the CCSR(s) that have been accessed are approved or not. If not, the method 400 proceeds to block 412, wherein the detection and management system 412 searches the access logs for one or more source IP addresses that accessed the CCSR(s). From block 412, the method 400 proceeds to block 414, wherein the detection and management system 112 generates a list of one or more IP addresses that have been used to access unauthorized CCSR(s). The method 400 may then proceed to block 416, wherein the method 400 ends. If, however, at block 410, the detection and management system 112 determines that only approved cloud computing resources have been accessed, the method 400 proceeds directly to block 416 and the method 400 ends.

The method 400 may repeat (e.g., periodically, continuously, or on-demand). In some embodiments, the method 400 is repeated on a periodic basis, as indicated at block 204 of the method 200.

Figure 5:
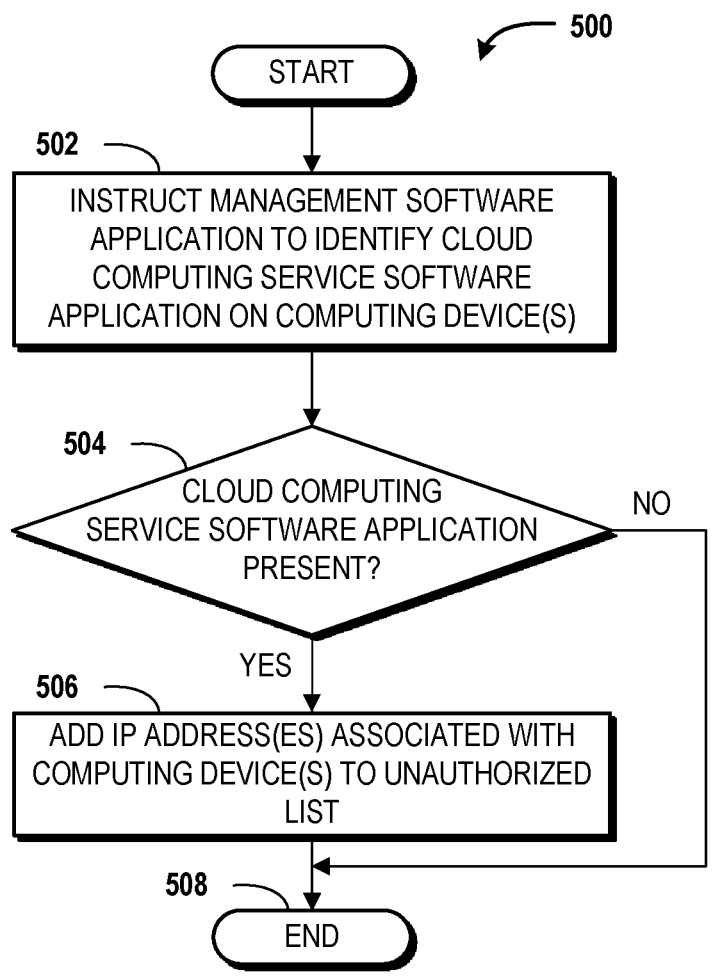
FIG. 5 is a flow diagram showing aspects of a method for utilizing a device management application to identify a cloud computing service application resident on a computing device, according to an illustrative embodiment.

Turning now to FIG. 5, a method 500 for utilizing the device management applications 132 to identify a cloud computing service software application resident on one or more of the computing devices 106 will be described, according to an illustrative embodiment. The method 500 begins and proceeds to block 502, wherein the detection and management system 112 instructs the device management application 132 that is installed on each of the computing devices 106 to identify any cloud computing software application also installed thereon. From operation 502, the method 500 proceeds to block 504, wherein the device management applications 132 determine if one or more cloud computing service software applications are stored on the respective computing devices 106. If not, the method 500 may proceed to block 508 and end. If so, the method 500 proceeds to block 506, wherein the device management applications 132 notify the detection and management system 112, and add the IP address associated with the offending computing device to the unauthorized list that was created at block 414 of the method 400 described above.

Figure 6:
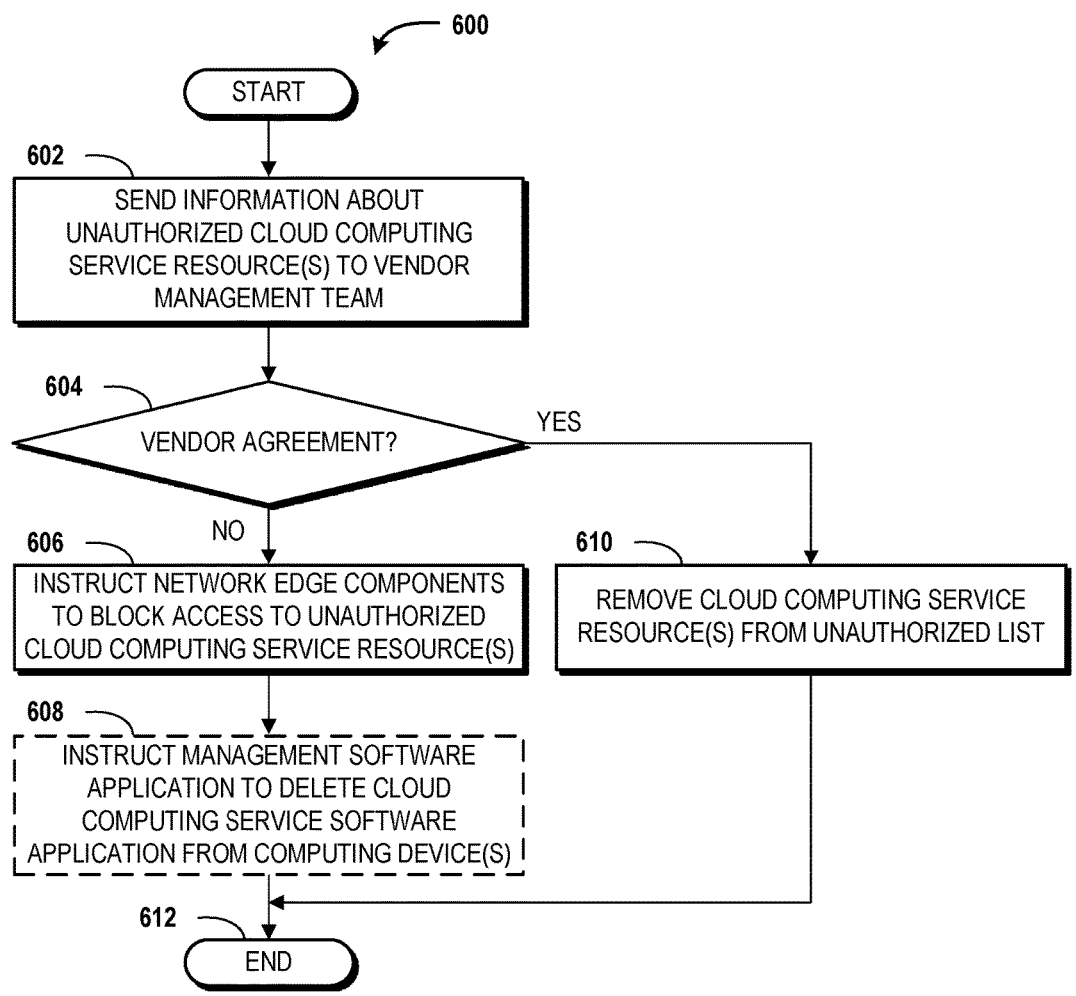
FIG. 6 is a flow diagram showing aspects of a method for selectively blocking access to an unauthorized cloud computing service resource, according to an illustrative embodiment.

Turning now to FIG. 6, a method 600 for selectively blocking access to an unauthorized CCSR, according to an illustrative embodiment. The method 600 may be used to verify any existing or pending vendor agreements that would affect the inclusion of one or more CCSRs within the unauthorized list that was created at block 414 of the method 400 described above. The operations, actions, and/or functions described as being performed at the illustrated blocks are described generically as being performed by the detection and management system 112. More particularly, though, the detection and management system 112 may execute the verification module 122 and the block module 124 to perform these operations, actions, and/or functions.

The method 600 begins and proceeds to block 602, wherein the detection and management system 112 sends information about an unauthorized CCSR to a vendor management team. From block 602, the method 600 proceeds to block 604, wherein the detection and management system 112 determines, based upon feedback received from the vendor management team, whether a vendor agreement exists between the owner and/or operator of the internal network 102 and the owner and/or operator of the unauthorized CC SR. If the detection and management system 112 determines, based upon the feedback, that no vendor agreement exists for a particular unauthorized CCSR, the method 600 proceeds to block 606. At block 606, the detection and management system 112 instructs the network edge components 116 to block access to the unauthorized CC SR. In some embodiments, the detection and management system 112 may also or alternatively instruct the device management applications 132 to delete any cloud computing service software applications associated with the unauthorized CCSR from the computing devices 106. If the detection and management system 112 determines, based upon the feedback, that a vendor agreement exists for the unauthorized CCSR, the method 600 proceeds to block 610, wherein the detection and management system 112 removes the CCSR from the unauthorized list.

After block 606, block 608, or block 610, the method 600 may proceed to block 612, wherein the method 600 may end. The method 600 may alternatively repeat (e.g., periodically, continuously, or on-demand) for another CCSR.

Figure 7:
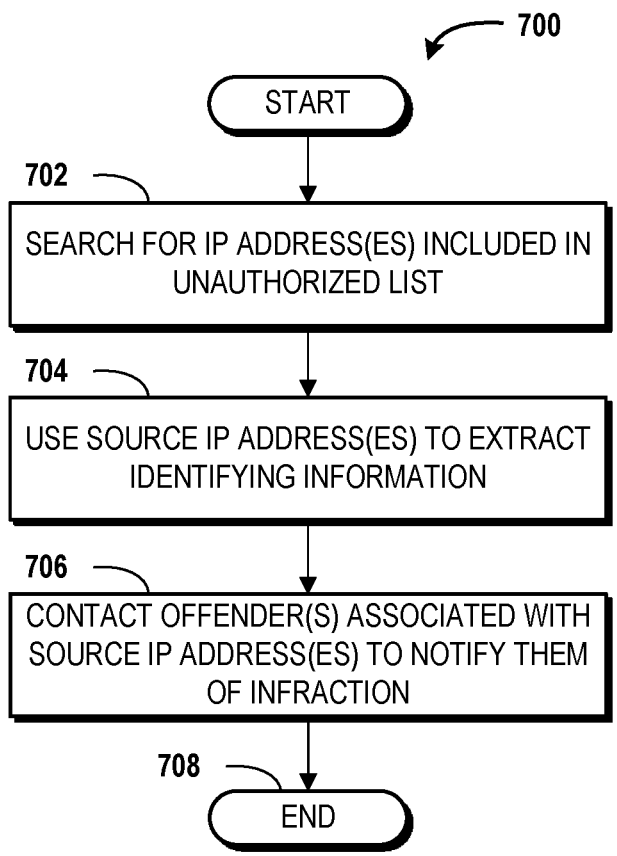
FIG. 7 is a flow diagram showing aspects of a method for searching for individuals that have accessed an unauthorized cloud computing service resource, according to an illustrative embodiment.

Turning now to FIG. 7, a method 700 for searching for individuals that have accessed an unauthorized CCSR to ensure ongoing compliance with a cloud computing service policy of the internal network 102 will be described, according to an illustrative embodiment. The operations, actions, and/or functions described as being performed at the illustrated blocks are described generically as being performed by the detection and management system 112. More particularly, though, the detection and management system 112 may execute the search module 126 and the policy compliance module 128 to perform these operations, actions, and/or functions.

The method 700 begins and proceeds to block 702, wherein the detection and management system 112 searches for one or more IP addresses that are included in the unauthorized list. From block 702, the method 700 proceeds to block 704, wherein the detection and management system 112 utilizes the source IP addresses to extract identifying information for one or more of the users 110. From block 704, the method 700 proceeds to block 706, wherein the detection and management system 112 contacts the one or more users 110 associated with the source IP addresses to notify them of the infraction. In some embodiments, additional actions may be taken by the owner and/or operator of the internal network 102 to penalize the offending user(s). After block 706, the method 700 may proceed to block 708, wherein the method 700 may end. The method 700 may alternatively repeat (e.g., periodically, continuously, or on-demand).

Figure 8:
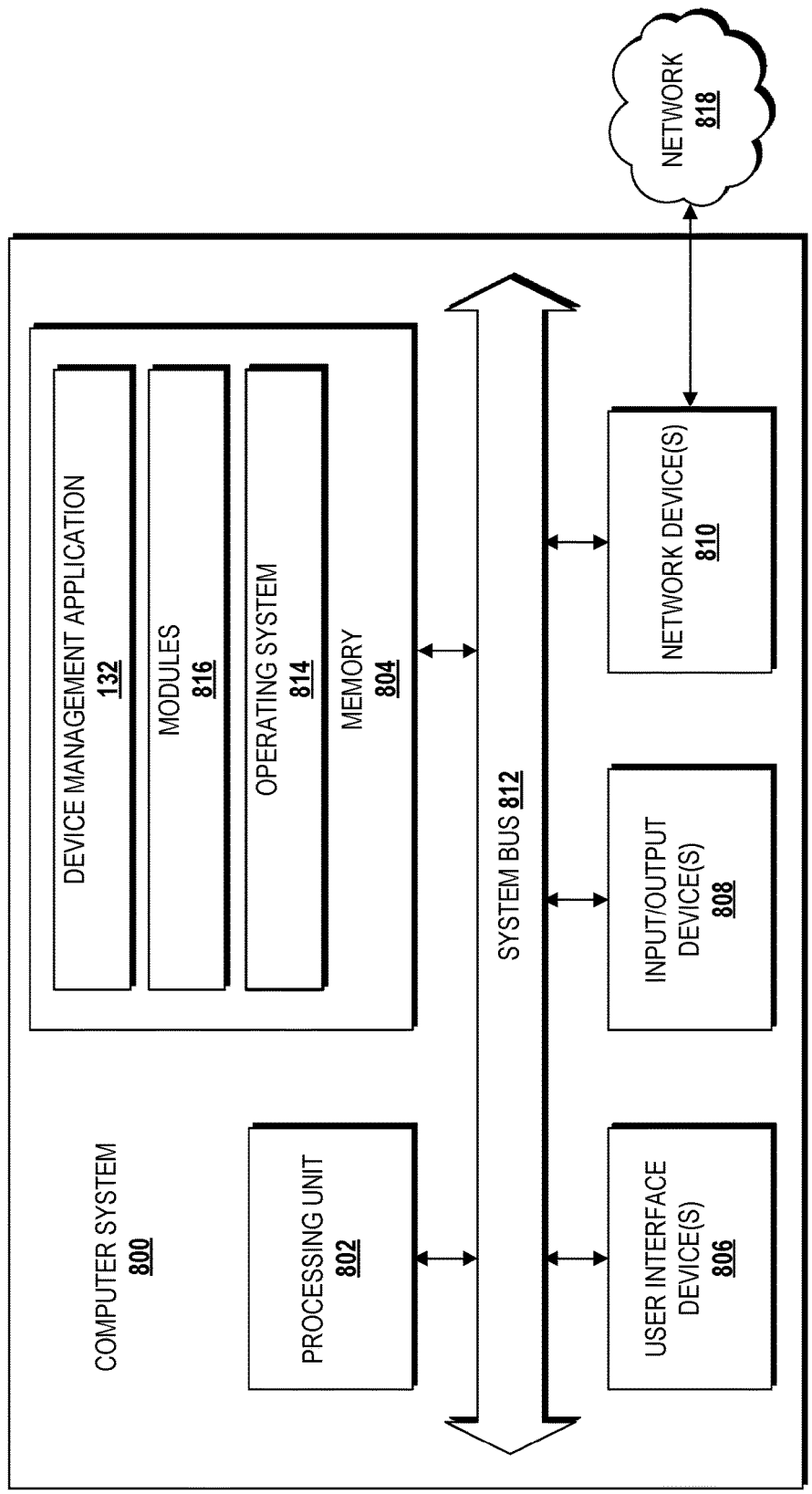
FIG. 8 is a computer architecture diagram illustrating an illustrative computer hardware and software architecture for a computing system capable of implementing aspects of the embodiments presented herein.

FIG. 8 is a block diagram illustrating a computer architecture 800 configured to perform various operations disclosed herein for detecting and managing unauthorized use of cloud computing services. Thus, the computer architecture 800 illustrated in FIG. 8 illustrates an architecture for a personal computer, a desktop workstation, a laptop computer, a tablet computer, a notebook computer, an ultraportable computer, a PDA, an electronic-book reader, a smartphone, a game console, a set-top box, a consumer electronics device, a server computer, or any other type of computing device configured to perform the various operations described herein for detecting and managing unauthorized use of cloud computing services. The computer architecture 800 may be utilized to execute any aspects of the software components presented herein.

In some embodiments, the detection and management system 112 is configured in accordance with the computer architecture 800. In some embodiments, the computing devices 106 are configured in accordance with the computer architecture 800. As such, software components of the detection and management system 112 and the computing devices 106 are shown together within the computer architecture 800 for ease of illustration. It should be understood, however, that these software components may be and are likely to be implemented in separate systems as in the embodiment illustrated in FIG. 1.

The computer architecture 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the computer architecture 800. Processing units are generally known, and therefore are not described in further detail herein.

The memory 804 communicates with the processing unit 802 via the system bus 812. In some embodiments, the memory 804 is operatively connected to a memory controller (not shown) that enables communication with the processing unit 802 via the system bus 812. The illustrated memory 804 includes an operating system 814, modules 816, and the device management application 132. The modules 816 include modules executed by the various systems described herein above to perform the operations, functions, and/or actions described herein. In particular, the module 816 may include the identification module 118, the IP information acquisition module 120, the verification module 122, the block module 124, the search module 126, and/or the policy compliance module 128.

The operating system 814 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 806 may include one or more devices with which a user accesses the computer architecture 800. The user interface devices 806 may include, but are not limited to, computers, servers, personal digital assistants, telephones (e.g., cellular, IP, or landline), or any suitable computing devices. The I/O devices 808 enable a user to interface with the program modules. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer architecture 800 to communicate with other networks or remote systems via a network 818. Examples of the network devices 810 include, but are not limited to, a modem, a radio frequency ("RF") or infrared ("IR") transceiver, a telephonic interface, a bridge, a router, a network card, or the network edge components 116. The network 818 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 822 may be a wired network such as, but not limited to, a WAN such as the Internet, a LAN such as the Ethernet, a wired personal area network ("PAN"), or a wired metropolitan area network ("MAN"). The network 818 may be the internal network 102.

The network 818 embodied as a cellular network may utilize a mobile telecommunications technology such as, but not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 818 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards.

As used herein, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the architecture 800. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for detecting and managing unauthorized use of cloud computing services have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method comprising:
aggregating, by a computing system comprising a processor, access logs from a plurality of network edge components communicatively coupled to an internal network;
obtaining, by the computer system, internet protocol information from the access logs, the internet protocol information comprising destination internet protocol addresses and source internet protocol addresses;
generating, by the computing system, a list of unique networks accessed from within the internal network based on the internet protocol information contained within the access logs;
identifying, by the computing system based on the internet protocol information, a cloud computing service resource that has been accessed from within the internal network;
determining, by the computing system, that the cloud computing service resource is not approved to be accessed from within the internal network, where the cloud computing service resource is designated as an unauthorized cloud computing service resource;
generating an unauthorized list comprising at least one source internet protocol address that has been used to access the unauthorized cloud computing service resource;
sending, to a vendor management team via the computing system comprising a processor, information about the unauthorized cloud computing service resource that has been accessed from within the internal network;
determining, by the computing system, based upon feedback received from the vendor management team, whether a vendor agreement exists between a first entity associated with the internal network and a second entity associated with the unauthorized cloud computing service resource that has been accessed from within the internal network;
in response to determining, based upon the feedback received from the vendor management team, that no vendor agreement exists between the first entity associated with the internal network and the second entity associated with the unauthorized cloud computing service resource, instructing, by the computing system, a network edge component to block access to the unauthorized cloud computing service resource from the internal network;
instructing, by the computing system, a device management application to identify any cloud computing service software applications that are installed on a computing device within the internal network;
determining, by the computing system, that a cloud computing service software application associated with the unauthorized cloud computing service resource is resident on the computing device within the internal network; and
appending, by the computing system, an internet protocol address associated with the computing device to the unauthorized list.

2. The method of claim 1, further comprising instructing, by the computing system, the device management application to delete the cloud computing service software application associated with the unauthorized cloud computing service resource.

3. The method of claim 1, further comprising in response to determining, based upon the feedback received from the vendor management team, that a vendor agreement exists between the first entity associated with the internal network and the second entity associated with the unauthorized cloud computing service resource, removing, by the computing system, the unauthorized cloud computing service resource from the unauthorized list.

4. The method of claim 1, wherein generating, by the computing system, the unauthorized list comprising the at least one source internet protocol address that has been used to access the unauthorized cloud computing service resource is based on searching the access logs from the plurality of network edge components.

5. The method of claim 1, wherein determining, by the computing system, based upon the feedback received from the vendor management team, whether a vendor agreement exists between the first entity associated with the internal network and the second entity associated with the unauthorized cloud computing service resource comprises determining, by the computing system, based upon the feedback received from the vendor management team, whether the vendor agreement exists between an owner or operator associated with the internal network and an operator associated with the unauthorized cloud computing service resource.

6. The method of claim 1, wherein determining, by the computing system, based upon the feedback received from the vendor management team, whether a vendor agreement exists between the first entity associated with the internal network and the second entity associated with the unauthorized cloud computing service resource comprises determining, by the computing system, based upon the feedback received from the vendor management team, whether the vendor agreement exists between the an owner or operator associated with the internal network and an owner associated with the unauthorized cloud computing service resource.

7. A computer storage medium comprising computer-executable instructions that, when executed by a processor of a computing system, cause the computing system to perform operations comprising:
aggregating access logs from a plurality of network edge components communicatively coupled to an internal network;
obtaining internet protocol information from the access logs, the internet protocol information comprising destination internet protocol addresses and source internet protocol addresses;
generating a list of unique networks accessed from within the internal network based on the internet protocol information contained within the access logs;
identifying, based on the internet protocol information, a cloud computing service resource that has been accessed from within the internal network;
determining that the cloud computing service resource is not approved to be accessed from within the internal network, where the cloud computing service resource is designated as an unauthorized cloud computing service resource;
generating an unauthorized list comprising at least one source internet protocol address that has been used to access the unauthorized cloud computing service resource;
sending, to a vendor management team, information about the unauthorized cloud computing service resource that has been accessed from within the internal network;
determining, based upon feedback received from the vendor management team, whether a vendor agreement exists between a first entity associated with the internal network and a second entity associated with the unauthorized cloud computing service resource that has been accessed from within the internal network;
in response to determining, based upon the feedback received from the vendor management team, that no vendor agreement exists between the first entity associated with the internal network and the second entity associated with the unauthorized cloud computing service resource, instructing a network edge component to block access to the unauthorized cloud computing service resource from the internal network
instructing a device management application to identify any cloud computing service software applications that are installed on a computing device within the internal network;
determining that a cloud computing service software application associated with the unauthorized cloud computing service resource is resident on the computing device within the internal network; and
appending an internet protocol address associated with the computing device to the unauthorized list.

8. The computer storage medium of claim 7, wherein the operations further comprise instructing the device management application to delete the cloud computing service software application associated with the unauthorized cloud computing service resource.

9. The computer storage medium of claim 7, wherein the operations further comprise in response to determining, based upon the feedback received from the vendor management team, that a vendor agreement exists between the first entity associated with the internal network and the second entity associated with the unauthorized cloud computing service resource, removing the unauthorized cloud computing service resource from the unauthorized list.

10. The computer storage medium of claim 9, wherein generating the unauthorized list comprising the at least one source internet protocol address that has been used to access the unauthorized cloud computing service resource is based on searching the access logs from the plurality of network edge components.

11. The computer storage medium of claim 7, wherein determining, based upon the feedback received from the vendor management team, whether a vendor agreement exists between the first entity associated with the internal network and the second entity associated with the unauthorized cloud computing service resource comprises determining, based upon the feedback received from the vendor management team, whether the vendor agreement exists between an owner or operator associated with the internal network and an operator associated with the unauthorized cloud computing service resource.

12. The computer storage medium of claim 7, wherein determining, based upon the feedback received from the vendor management team, whether a vendor agreement exists between the first entity associated with the internal network and the second entity associated with the unauthorized cloud computing service resource comprises determining, based upon the feedback received from the vendor management team, whether the vendor agreement exists between an owner or operator associated with the internal network and an owner associated with the unauthorized cloud computing service resource.

13. A computing system comprising:
a processor; and
memory that stores instructions that, when executed by the processor, cause the computing system to perform operations comprising
aggregating access logs from a plurality of network edge components communicatively coupled to an internal network;
obtaining internet protocol information from the access logs, the internet protocol information comprising destination internet protocol addresses and source internet protocol addresses;
generating a list of unique networks accessed from within the internal network based on the internet protocol information contained within the access logs;
identifying, based on the internet protocol information, a cloud computing service resource that has been accessed from within the internal network;
determining that the cloud computing service resource is not approved to be accessed from within the internal network, where the cloud computing service resource is designated as an unauthorized cloud computing service resource;
generating an unauthorized list comprising at least one source internet protocol address that has been used to access the unauthorized cloud computing service resource;
sending, to a vendor management team, information about the unauthorized cloud computing service resource that has been accessed from within the internal network,
determining, based upon feedback received from the vendor management team, whether a vendor agreement exists between a first entity associated with the internal network and a second entity associated with the unauthorized cloud computing service resource that has been accessed from within the internal network, in response to determining, based upon the feedback received from the vendor management team, that no vendor agreement exists between the first entity associated with the internal network and the second entity associated with the unauthorized cloud computing service resource, instructing a network edge component to block access to the unauthorized cloud computing service resource from the internal network instructing a device management application to identify any cloud computing service software applications that are installed on a computing device within the internal network;

determining that a cloud computing service software application associated with the unauthorized cloud computing service resource is resident on the computing device within the internal network; and appending an internet protocol address associated with the computing device to the unauthorized list.

14. The computing system of claim 13, wherein the operations further comprise instructing the device management application to delete the cloud computing service software application associated with the unauthorized cloud computing service resource.

15. The computing system of claim 13, wherein the operations further comprise in response to determining, based upon the feedback received from the vendor management team, that a vendor agreement exists between the first entity associated with the internal network and the second entity associated with the unauthorized cloud computing service resource, removing the unauthorized cloud computing service resource from the unauthorized list.

16. The computing system of claim 15, wherein generating the unauthorized list comprising the at least one source internet protocol address that has been used to access the unauthorized cloud computing service resource.

17. The computing system of claim 13, wherein determining, based upon the feedback received from the vendor management team, whether a vendor agreement exists between the first entity associated with the internal network and the second entity associated with the unauthorized cloud computing service resource comprises determining, based upon the feedback received from the vendor management team, whether the vendor agreement exists between an owner or operator associated with the internal network and an operator associated with the unauthorized cloud computing service resource.

18. The computing system of claim 13, wherein determining, based upon the feedback received from the vendor management team, whether a vendor agreement exists between the first entity associated with the internal network and the second entity associated with the unauthorized cloud computing service resource comprises determining, based upon the feedback received from the vendor management team, whether the vendor agreement exists between an owner or operator associated with the internal network and an owner associated with the unauthorized cloud computing service resource.

19. The computing system of claim 13, wherein the unauthorized cloud computing service resource provides, at least in part, a platform as a service.

20. The computing system of claim 13, wherein the unauthorized cloud computing service resource provides, at least in part, a software as a service.

* * * * *